United States Patent
Blandin et al.

(10) Patent No.: US 7,616,188 B1
(45) Date of Patent: Nov. 10, 2009

(54) MOUSE ROLLER WITH HORIZONTAL SCROLLING AND HORIZONTAL TILTING SWITCH

(75) Inventors: Christian M. Blandin, Ballincollig (IE); Neil G. O'Connell, Cork (IE); Philippe Junod, Romanel-sur-Morges (CH); Marc Bidiville, Pully (CH)

(73) Assignee: Logitech Europe S.A. (CH)

( * ) Notice: Subject to any disclaimer, the term of this patent is extended or adjusted under 35 U.S.C. 154(b) by 483 days.

(21) Appl. No.: 10/922,393

(22) Filed: Aug. 19, 2004

Related U.S. Application Data

(60) Provisional application No. 60/498,915, filed on Aug. 29, 2003, provisional application No. 60/497,122, filed on Aug. 22, 2003.

(51) Int. Cl.
G06F 3/033 (2006.01)
G09G 5/08 (2006.01)

(52) U.S. Cl. .................. 345/163; 345/164; 345/165; 345/166; 345/167

(58) Field of Classification Search .......... 345/163, 345/164, 165, 166, 167
See application file for complete search history.

(56) References Cited

U.S. PATENT DOCUMENTS

| | | | |
|---|---|---|---|
| 4,794,388 A | 12/1988 | Matthews | |
| 5,136,132 A * | 8/1992 | Kitchen | 200/525 |
| 5,446,481 A | 8/1995 | Gillick et al. | |
| 5,530,455 A | 6/1996 | Gillick et al. | |
| 5,570,778 A * | 11/1996 | Gernhardt et al. | 200/557 |
| 5,659,334 A | 8/1997 | Yaniger et al. | |
| 5,883,619 A | 3/1999 | Ho et al. | |
| 5,912,661 A * | 6/1999 | Siddiqui | 345/166 |
| 6,075,518 A * | 6/2000 | Pruchniak | 345/157 |
| 6,204,838 B1 | 3/2001 | Wang et al. | |
| 6,340,966 B1 * | 1/2002 | Wang et al. | 345/163 |
| 6,587,093 B1 | 7/2003 | Shaw et al. | |
| 6,700,564 B2 * | 3/2004 | McLoone et al. | 345/156 |
| 6,798,397 B2 * | 9/2004 | O'Keeffe et al. | 345/163 |
| 7,079,110 B2 * | 7/2006 | Ledbetter et al. | 345/156 |
| 7,193,612 B2 * | 3/2007 | Lindhout et al. | 345/164 |
| 2002/0154090 A1 | 10/2002 | Lin | |
| 2002/0158844 A1 | 10/2002 | McLoone et al. | |
| 2003/0025673 A1 | 2/2003 | Ledbetter et al. | |

FOREIGN PATENT DOCUMENTS

| | | |
|---|---|---|
| DE | 4405962 | 6/1995 |
| DE | 203 00 281 U1 | 4/2003 |
| EP | 0669715 | 8/1995 |
| EP | 1 182 606 A2 | 2/2002 |
| JP | 2002-366300 | 12/2002 |
| JP | 2003-022160 | 1/2003 |
| WO | WO 00/058819 A1 | 10/2000 |

OTHER PUBLICATIONS

The Standard Handbook of Machine Design / editors in chief, Joseph E. Shigley, Charles R. Mischke.—2nd ed., Copyright 1996 by the McGraw-Hill Companies, Inc., p. 41.2.*

* cited by examiner

*Primary Examiner*—Amare Mengistu
*Assistant Examiner*—Robert R Rainey
(74) *Attorney, Agent, or Firm*—Townsend and Townsend and Crew LLP

(57) ABSTRACT

A number of embodiments of a rotatable member or wheel that can be mounted in a mouse or other input device that allows both rotation and response to lateral pressure for horizontal or other scrolling.

15 Claims, 13 Drawing Sheets

MOUSE ROLLER WITH HORIZONTAL SCROLLING AND HORIZONTAL TILTING SWITCH

CROSS-REFERENCES TO RELATED APPLICATIONS

This application claims priority to U.S. Provisional Patent Application No. 60/497,122, filed Aug. 22, 2003, of Christian M. Blandin, titled "Mouse Roller with Horizontal Scrolling," and U.S. Provisional Patent Application No. 60/498,915, filed Aug. 29, 2003, of Christian M. Blandin, titled "Mouse Roller with Horizontal Scrolling and Horizontal Tilting Switch," both of which are incorporated by reference herein in their entireties for all purposes.

BACKGROUND OF THE INVENTION

The present invention relates to support structures for rotatable input devices, and in particular to mouse rollers configured to provide horizontal scrolling in response to lateral pressure on the roller.

Microsoft published US Application No. 2003/0025673 shows a mouse with a wheel that is tiltable in a carriage and assembly carrier structure to provide horizontal scrolling in addition to the vertical scrolling from rotation of the wheel. This published application claims priority from published US Application No. 2002/0158844 that shows a scrolling wheel that slides laterally to provide for horizontal scrolling.

Gillick U.S. Pat. No. 5,446,481 shows a roller on a mouse that can be tilted to activate Z-axis inputs. A number of other approaches have been taken to provide horizontal or a similar type of scrolling.

One approach is to provide a button near the scrolling wheel that switches the wheel from controlling vertical to horizontal scrolling. Examples are Gillick U.S. Pat. No. 5,530,455 and Toshiba published Japanese Application No. JP 2002366300. The use of separate left and right scrolling buttons is shown, for example, in K. S. Cheng German published Application No. DE 20300281.

The use of a microstick, like a mini-joystick, on a mouse is shown in Yaniger U.S. Pat. No. 5,659,334, Synaptics U.S. Pat. No. 6,587,093, and Primax U.S. Pat. No. 6,204,838.

An optical sensor on the top of a mouse for sensing horizontal movement of a finger, in addition to vertical is shown in Agilient published European Application No. EP 1182606.

The use of two separate scrolling wheels on a mouse, one for vertical and another for horizontal movement is shown in Nippon published Japanese Application No. JP 2003022160.

A four-way button on a mouse for providing horizontal input is shown in Primax U.S. Pat. No. 5,883,619.

A saddle-shaped joystick on a mouse is shown in IBM published Application No. WO 200058819.

It is desirable to have an improved scrolling wheel design that is simple to manufacture and easy to use.

BRIEF SUMMARY OF THE INVENTION

The present invention provides a number of embodiments of a rotatable member or wheel that can be mounted in a mouse or other input device that allows both rotation and response to lateral pressure for horizontal or other scrolling.

In a first embodiment, the wheel or other rotatable member is supported by a fixture that allows it to rotate and has an appendage extending from one side. A support for the appendage is structured to allow the appendage to both rotate with a sideways tilting of the wheel, and also to allow the fixture to pivot downward in response to downward pressure on the wheel, such as for activating a microswitch to provide a click input.

In a second embodiment, a fixture supports the rotatable member so that it can rotate, and the fixture is itself engaged by a support in a position offset from the wheel. This support allows the fixture to both swing in a horizontal plane about the support, and also allows the fixture and wheel to be displaced downward. Thus, the fixture swings in response to lateral pressure on the wheel, and displaces downward in response to downward pressure on the wheel.

In a third embodiment, a wheel is supported in a fixture, with a pivot link below the fixture supporting the fixture and allowing tilting movement of the fixture in response to lateral pressure on the wheel. Below the pivot link is provided a sliding link, which can slide up and down in the housing, thereby allowing the pivot link and fixture with the wheel to be displaced downward in response to downward pressure.

A fourth embodiment supports the wheel on an arm, with the arm being supported by a pivot. The pivot allows lateral movement of the wheel in response to lateral pressure, and is sufficiently removed from the wheel for it to appear to the user to be simple sideways movement of the wheel. The pivot also allows downward displacement of the wheel by pivoting the arm downward.

In a fifth embodiment, a wheel with an axle is supported on a fixture. Either the wheel moves along the axle, or the wheel and axle can move laterally, with sensors mounted on the two sides to detect the lateral movement. A sensor mounted adjacent the wheel detects rotational movement of the wheel, and preferably includes a lens for providing an accurate signal regardless of the varying distance from the sensor.

A sixth embodiment provides a wheel supported on a fixture for rotation with a pressure sensor coupled to a portion of the fixture to detect pressure applied. In one embodiment, the wheel is supported by two columns, with the bottom of the columns being mounted over pressure sensors. These pressure sensors can detect downward pressure on the wheel when both sensors are activated, or lateral pressure on the wheel when one sensor detects more than the other.

A seventh embodiment provides a wheel with a frame at least partially enclosing the wheel. The rotation of the wheel is detected, and pressure applied to the ends of the frames is also detected. In one embodiment, the frame tilts side to side for horizontal scrolling, and tilts forward and back to increase the scrolling speed in the up or down direction.

An eighth embodiment provides an input device for scrolling and includes a rotatable member; a rocking member configured to support the rotatable member and allow rotation of the rotatable member with respect to the rocking member, the rocking member being supported to rock from side to side to provide sideways tilting of the rotatable member; and at least one tilting switch disposed near the rocking member and configured to be activated by sideways rocking of the rocking member and sideways tilting of the rotatable member.

For a further understanding of the nature and advantages of the invention, reference should be made to the following description taken in conjunction with the accompanying drawings.

DETAILED DESCRIPTION OF THE INVENTION

Figure 1:
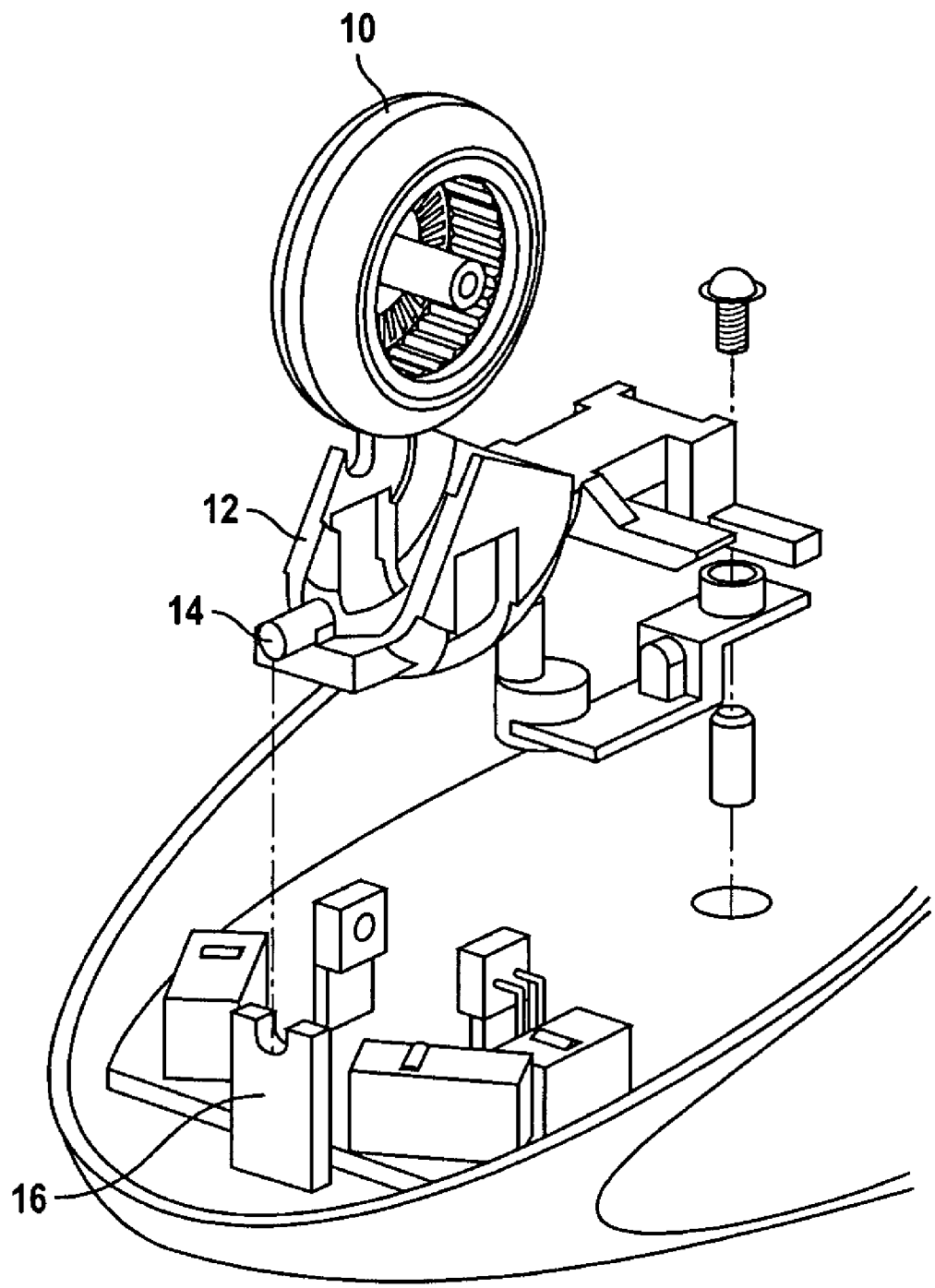
FIG. 1 is an exploded view of an embodiment of a wheel supported in a fixture that allows both rotation for tilting and downward pivoting from a pivot point.

FIG. 1 illustrates a wheel 10 that mounts on a tilting fixture 12. The tilting fixture has an extending appendage 14 from one side in the shape of a cylinder. Appendage 14 fits into a semicircular slot in a tilting support 16. The slot is oblong in shape, with sides that restrain the cylindrical member 14 when fixture 12 is tilted, and also allow downward movement to compress a microswitch. The back end of fixture 12 is mounted above a curved surface that allows fixture 12 to rotate with tilting of the wheel.

Figure 2:
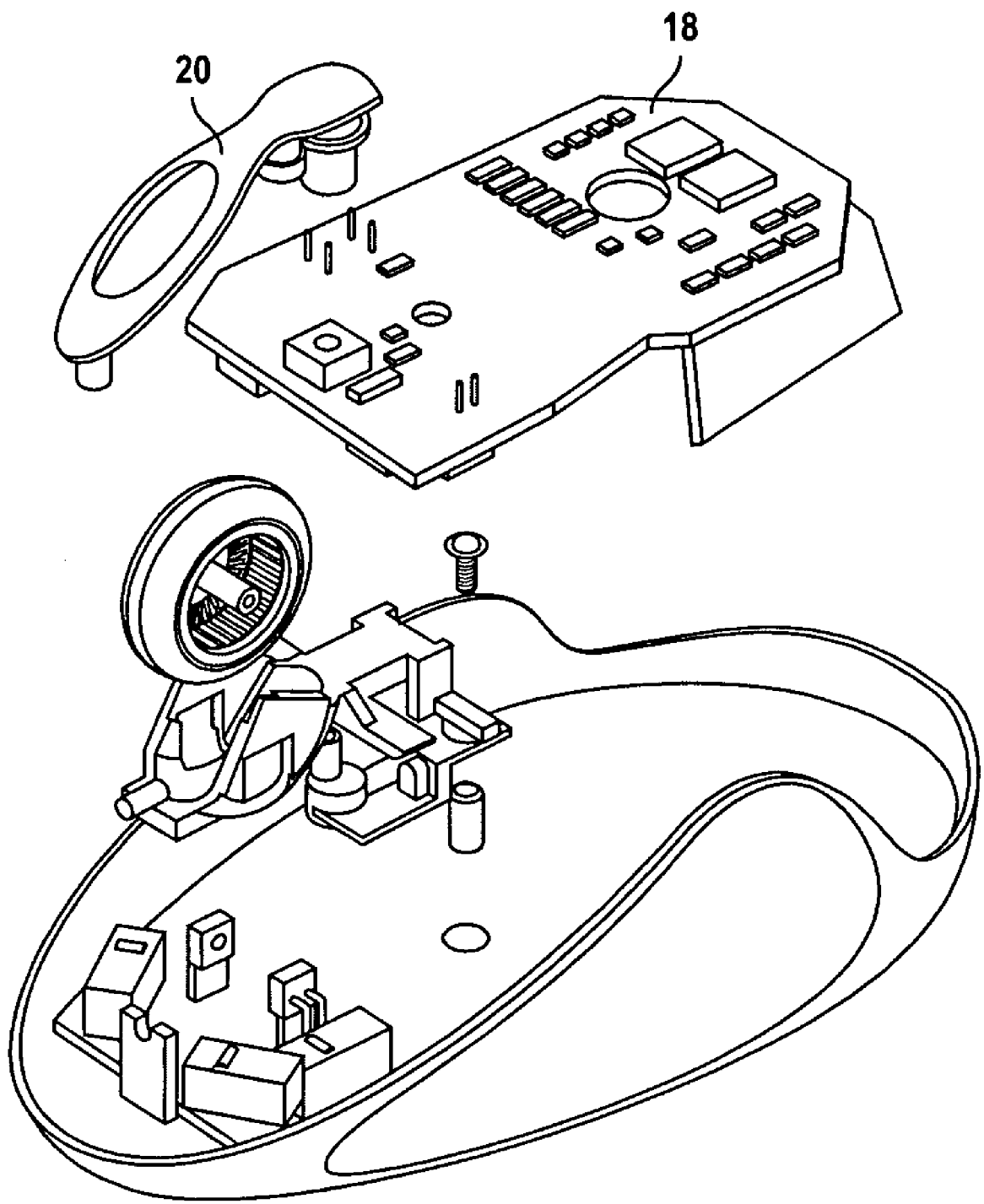
FIG. 2 shows further details of the embodiment of FIG. 1.

FIG. 2 illustrates a second printed circuit board (PCB) 18 mounted above the bottom of the mouse housing shown in FIG. 2, as well as a frame 20 for enclosing the wheel in the top housing of the mouse.

Figure 3:
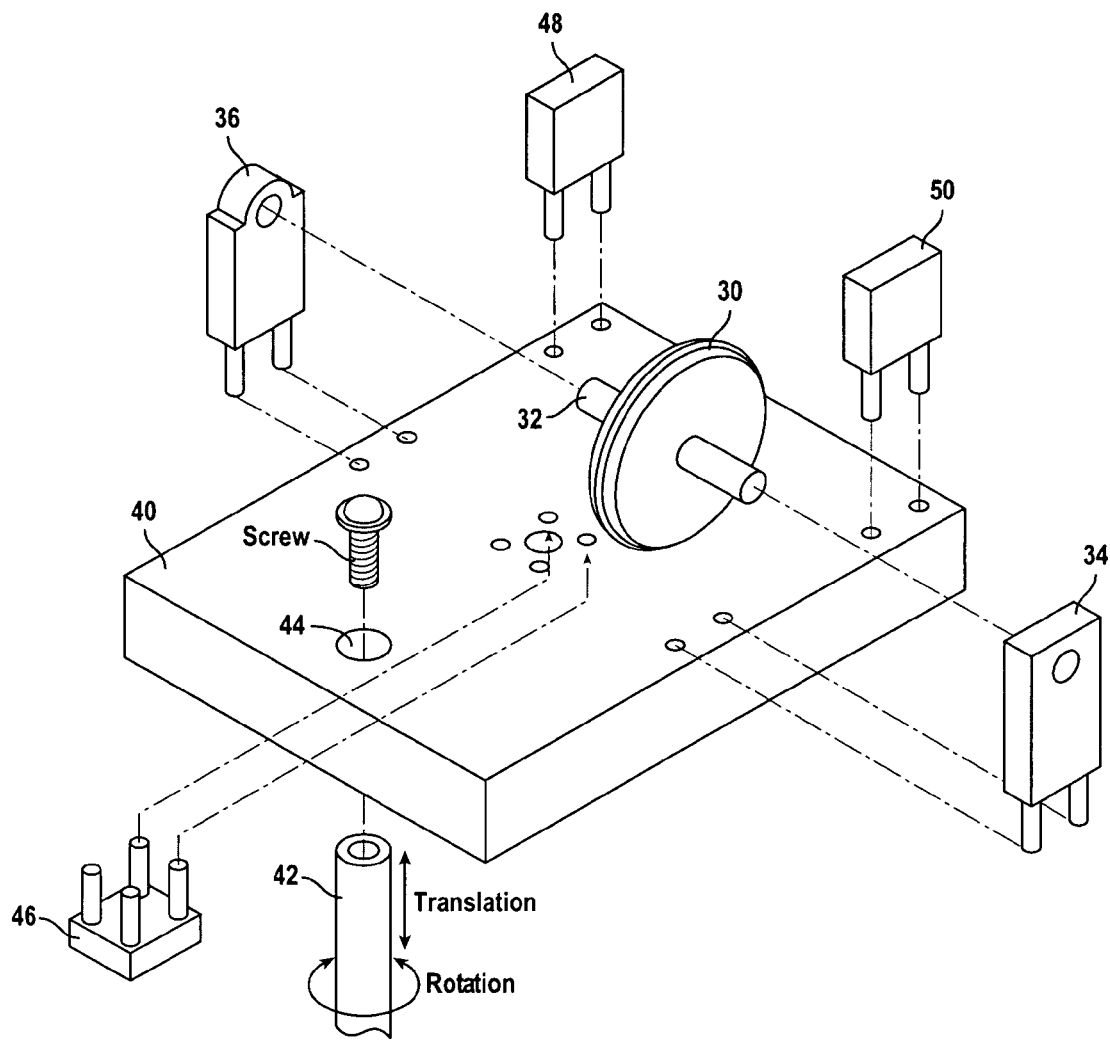
FIG. 3 is an exploded view of an embodiment of a wheel mounted on a swinging and depressible platform.

FIG. 3 illustrates a wheel 30 that rotates around an axle 32 supported by a wheel support 34 and a support and encoder switch 36. Encoder switch 36 records the rotations of the axle with the wheel. Wheel support 34 and encoder switch 36 are mounted on a PCB 40 that is itself mounted on a support post 42 fixed to the base of the mouse. Support post 42 engages a hole 44 in the PCB, allowing the PCB to rotate about post 42, and also to move up and down. The rotation provides a swinging lateral movement in response to lateral pressure on the wheel. Mounted below the PCB is a switch 46 that is activated when the wheel is depressed, pushing the PCB downward.

When lateral pressure is placed on wheel 30, causing PCB 40 to rotate around support 42, switches 48 and 50 will engage a portion of the housing (not shown) mounted adjacent and outside of the PCB, so that there will be contact when the PCB swings left or right. The switches then provide the horizontal scrolling signals. The scrolling can be simply initiated and maintained as long as the switch is activated, or can have a varying speed depending upon the length of activation, the force of activation or other parameters.

Figure 4:
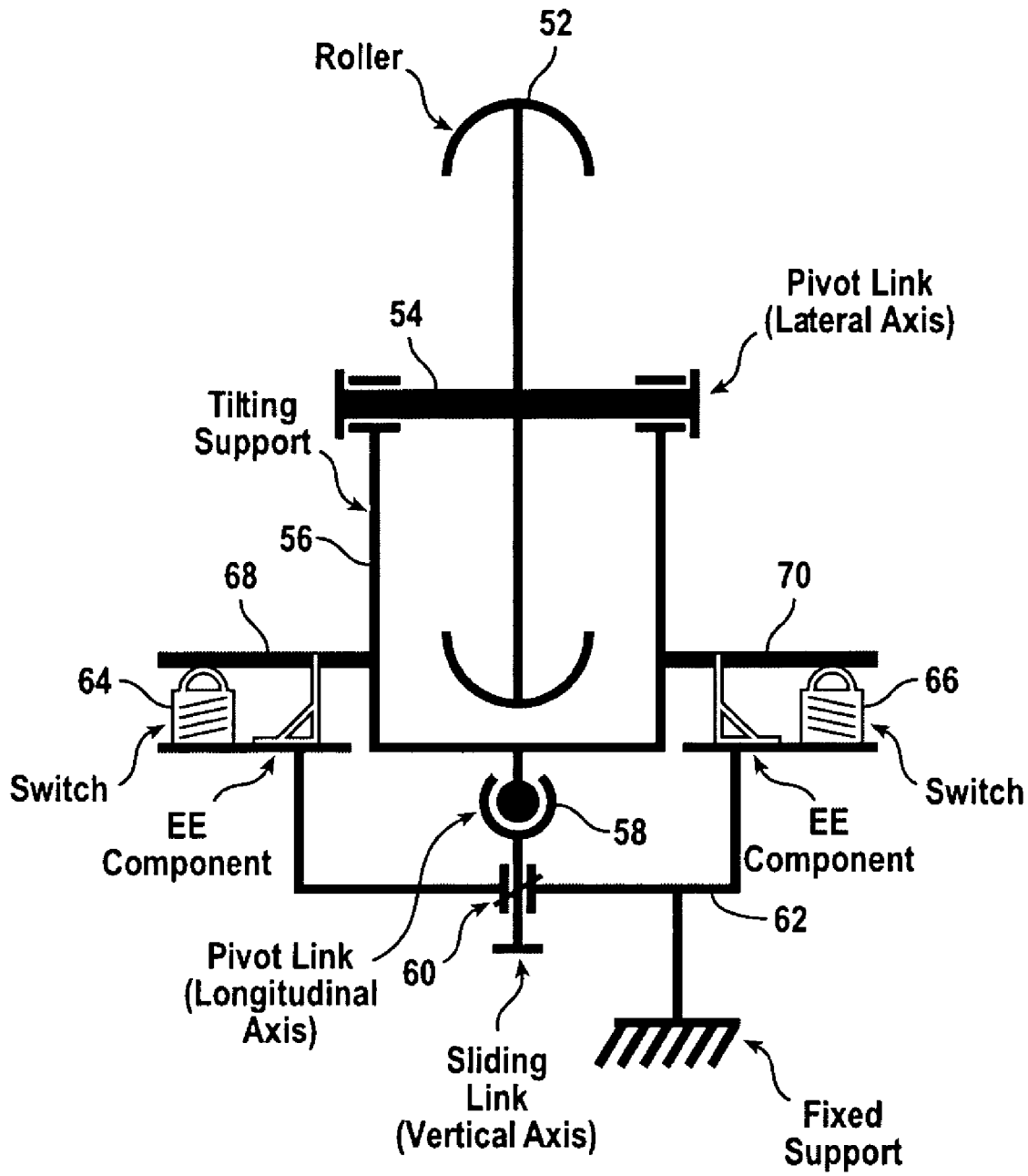
FIG. 4 is a diagram of an embodiment of a wheel mounted above a pivot link and sliding link.

FIG. 4 is a diagram illustrating a roller structure with a roller wheel 52 on an axle 54. The axle is supported by a tilting support 56. When lateral pressure is applied to roller 52, tilting support 56 can tilt with the wheel in pivot link 58. Pivot link 58 is itself supported by a sliding link 60 that permits up and down movement with respect to a fixed support 62 when downward pressure is provided on roller 52.

Switches 64 and 66 are mounted beneath extending arms 68 and 70, respectively, of tilting support 56. Thus, when the support is tilted, one or the other of these switches will be activated to provide a horizontal scrolling signal. The rotation of the wheel can be detected by optical sensors from either side of the wheel, or mechanical encoders interacting with the axle, as is known to those of skill in art. Downward movement can compress a microswitch (not shown) with the sliding link or the tilting support being supported by springs to provide support when the wheel is not depressed to keep it from sliding downward.

Figure 5:
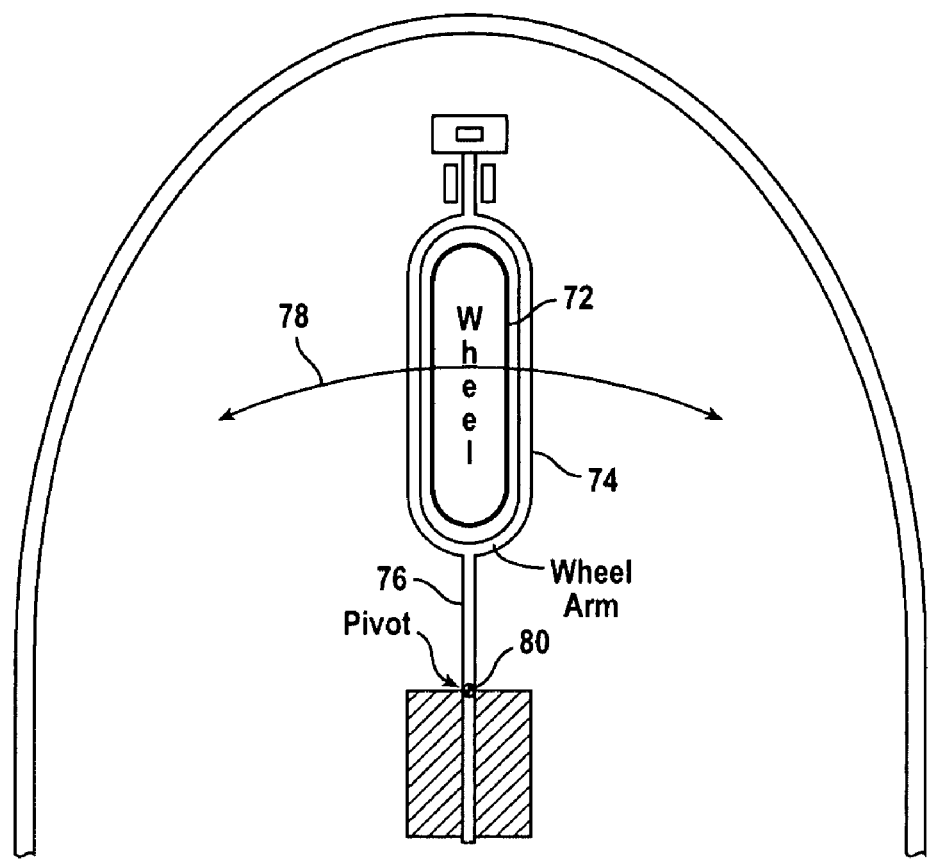
FIG. 5 is a diagram of a top view of an embodiment of a wheel that pivots on an arm both sideways and up and down.

FIG. 5 shows an embodiment with a wheel 72 rotating on an axle on a wishbone-shaped support 74 that is connected to a wheel arm 76. Wheel arm 76 pivots in the direction shown by arrows 78 about a pivot point 80. In addition, the wheel can move downward with respect to pivot point 80 to produce a desired clicking action of the wheel. Again, sensors can be provided to detect the various movements as indicated in the previous drawings or as indicated in the prior art cited in the Background of this application.

Figure 6:
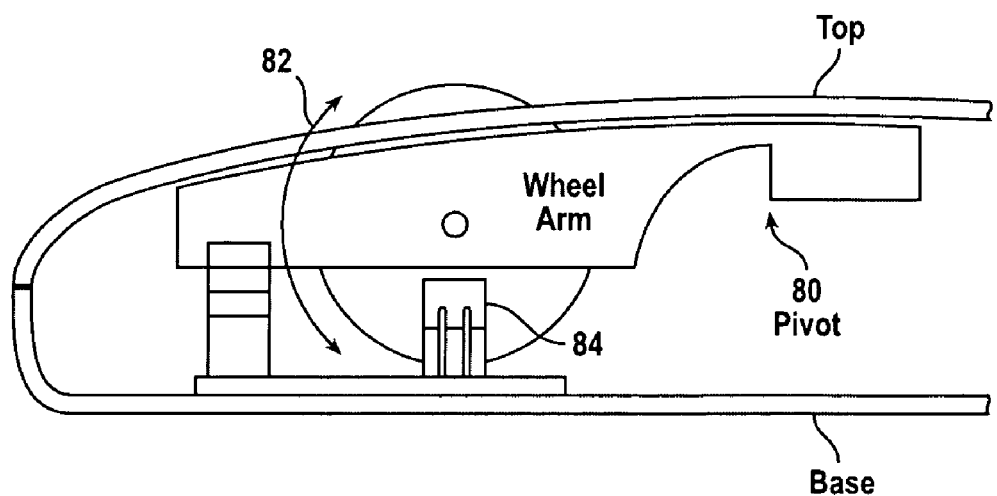
FIG. 6 is a side view of the embodiment of FIG. 5.

FIG. 6 shows a side view of the embodiment of FIG. 5 with arrows 82 illustrating the up and down movement about pivot point 80. A microswitch 84 below the wheel arm will detect the downward movement of the wheel.

Figure 7:
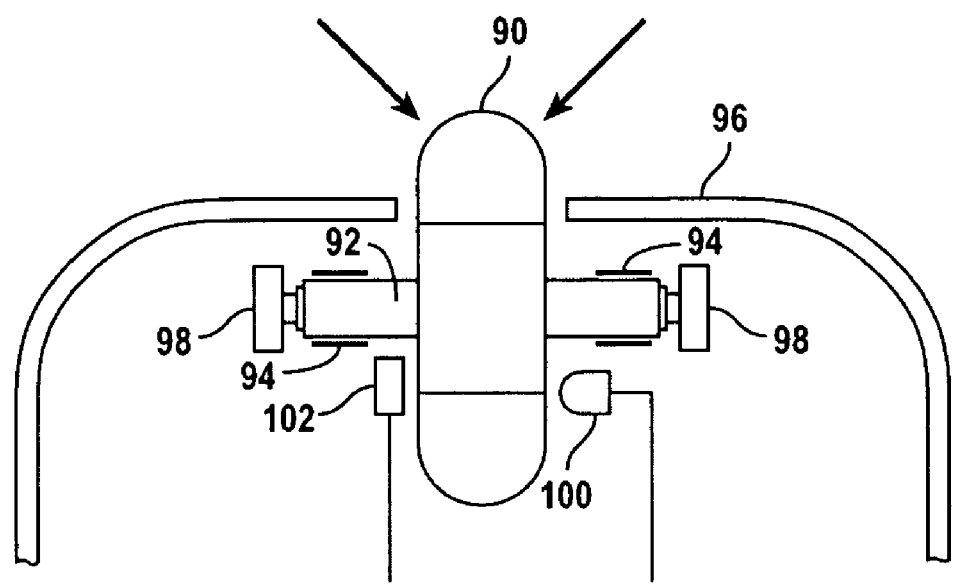
FIG. 7 is a diagram of an embodiment of a wheel that slides on an axis to contact lateral switches.

FIG. 7 illustrates an embodiment with a wheel 90 mounted on an axle 92. The axle moves within bearings 94 that are attached to a top case 96 of the mouse. These bearings allow lateral movement to contact pancake switches 98. Alternately, no lateral movement could be allowed, and pancake switches 98 could be replaced with pressure sensors, such as force-sensitive resistors (FSR). FIG. 7 shows the rotation of the wheel being detected by an LED 100 shining through slots in wheel 90 to be detected by a photodetector 102 in manner known to those of skill in the art.

Figure 8:
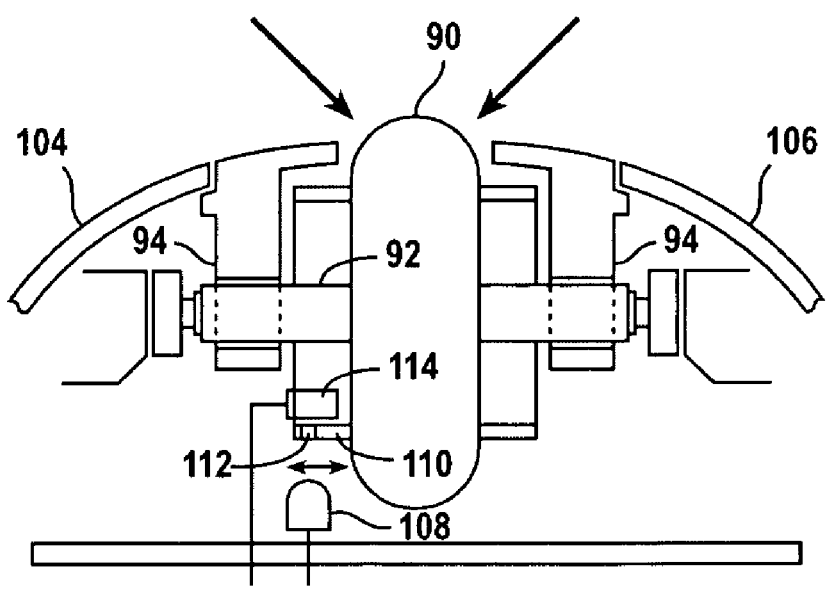
FIG. 8 is a diagram of a variation of the embodiment of FIG. 7.

FIG. 8 shows a variation of the embodiment of FIG. 7 wherein bearings 94 are attached to a middle portion of the mouse separate from side keys 104 and 106, which provide the right and left keys of a mouse. Shown is an LED 108 that provides light through a cylindrical attachment 110 extending from the side of the wheel. The cylindrical attachment 110 can have a series of slots to provide the normal rotational detection of wheel 90, similar to the sensors 100 and 102 shown in FIG. 7, except in a different orientation. In addition, when wheel 90 is moved side-to-side, the amount of light extending through slits 112 will vary across photodetector 114 both in amount and direction, allowing detection of the lateral movement of the wheel.

With respect to the embodiments of FIGS. 7 and 8, current rollers can be clicked by pressing them down. This feature is very seldom used. It requires a relatively complicated, i.e., expensive, mechanism to allow the roller to move up and down. The proposed structure instead can provide a clicking action by lateral movement of the wheel, by moving the shaft horizontally in its bearings. This way it is possible to generate two actions (right and left) instead of one (down). The simpler bearings allow much better guiding, resulting in an improved quality aspect, smoother rolling and better feeling. Alternatively, the sliding mechanism can be used for horizontal scrolling or other inputs, with downward movement provided for to allow the current roller click function (but losing the advantages of the simpler structure). Preferably, the roller protrudes from the mouse housing more than the current roller designs (around 2 mm) so that a good lateral surface gives enough grip (e.g., 3-4 mm).

The horizontal movement of the roller will degrade the quality of the image on the multiple-element photo-sensor when the roller is moved away from the sensor. This can be corrected by one of the following solutions: (1) Using optical structures in the encoding disk instead of holes (slots) and bars, or (2) adding a crude lens in the optical path to increase the depth of field. An alternative is to replace the switches at both ends of the shaft with force sensors so that movement is not required. This can also be used to provide an analog input allowing a more sophisticated response. For example, horizontal scrolling could be done at a speed proportional to the force detected.

Figure 9:
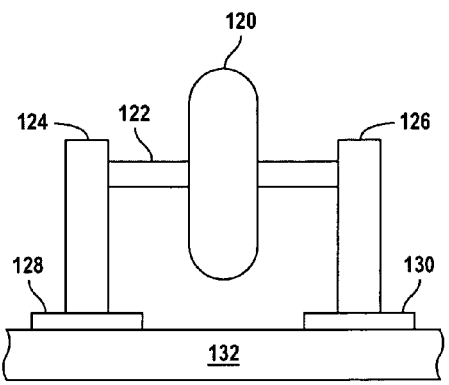
FIGS. 9-12 are diagrams illustrating an embodiment of a wheel mounted on columns that are above force-sensitive resistors to sense lateral and downward pressure on a wheel without requiring movement.

FIG. 9 illustrates an embodiment with a wheel 120 mounted on an axle 122 supported by columns 124 and 126. These columns are in turn supported above force-sensitive resistors 128 and 130 mounted on a PCB 132.

Figure 10:
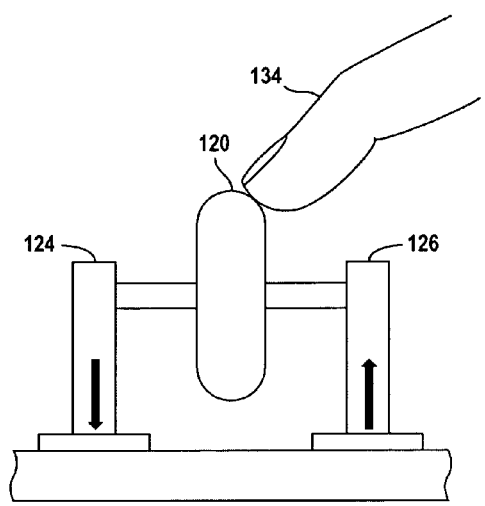

FIG. 10 illustrates sideways movement from a finger 134 on wheel 120, resulting in a downward force on column 124 and a corresponding upward force on column 126. Thus, the force-sensitive resistors can provide signals indicating the horizontal scrolling is desired in a first direction.

Figure 11:
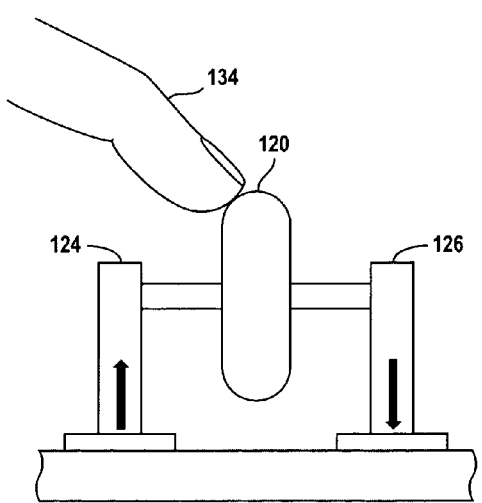

FIG. 11 shows finger 134 pressing in the opposite direction, with the forces being reversed, allowing the FSRs to detect motion in the opposite direction.

Figure 12:
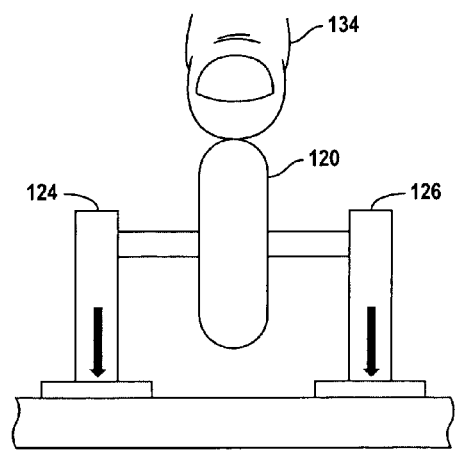

FIG. 12 illustrates downward pressure by finger 134 on wheel 120, resulting in equal downward forces on columns 124 and 126. These equal signals will be interpreted to provide a click or Z-axis scrolling. In one embodiment, the axle can be rigid so that the user applies force in the downward or lateral directions, but does not observe movement of the wheel. In an alternate embodiment, the axle can be spring-mounted to allow downward movement that a user expects with a normal click operation when downward pressure is applied. These springs can be constructed either so that they also allow tilting movement when lateral pressure is applied, or so that they do not allow tilting movement, but only allow downward movement or any movement at all when downward pressure is applied. Alternately, a spring could be mounted between the wheel and the axle, allowing the user the feedback of having the wheel actually depress, while the columns and axle remain stationary.

Figure 13:
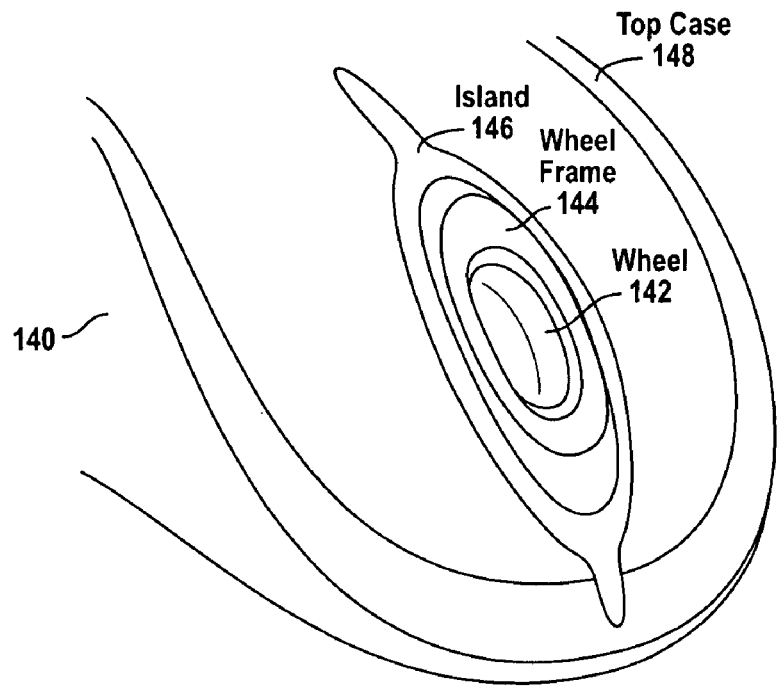
FIG. 13 is a perspective view of an embodiment of a wheel in a mouse having a wheel frame.

FIG. 13 illustrates a mouse 140 with a wheel 142 mounted in a wheel frame 144. The wheel frame is in turn mounted in an island 146 in the top case 148 of the mouse. In addition to the wheel being rotatable, wheel frame 144 can pivot forward or backward in response to user pressure. In an alternate embodiment, the frame can tilt left or right while the wheel remains fixed to provide, for example, horizontal scrolling signals.

Figure 14:
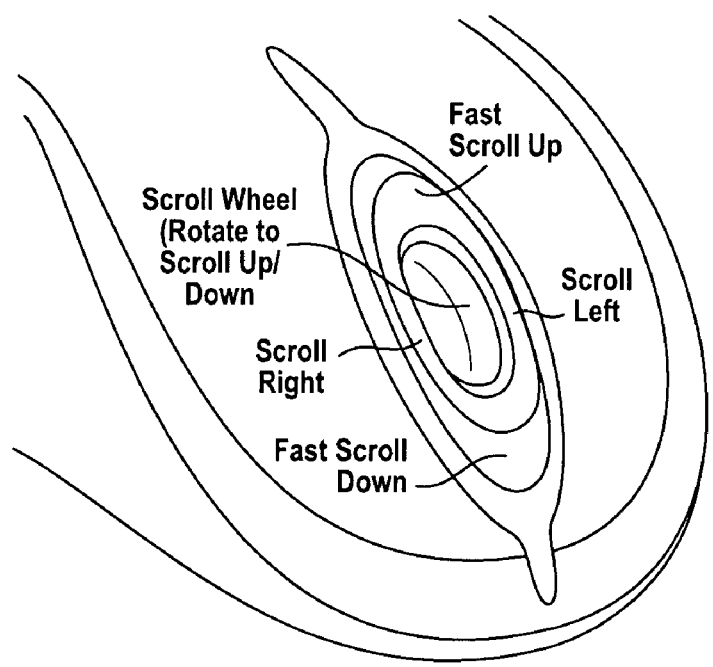
FIG. 14 is a diagram of the embodiment of FIG. 13 illustrating additional details.

FIG. 14 illustrates that the scrolling wheel is rotated to scroll up and down with the frame being tilted left or right to provide left and right scrolling, and tilting forward and back to provide fast scrolling either up or down.

Figure 15:
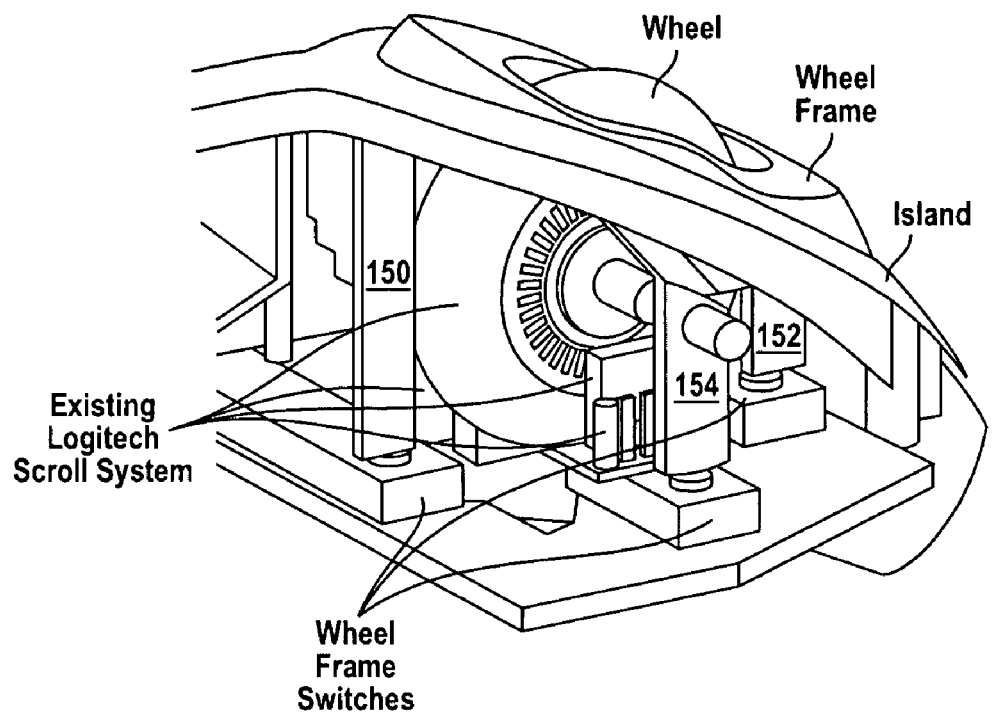
FIG. 15 is a cutaway view of a portion of the embodiment of FIG. 13.

FIG. 15 is a cutaway view of the embodiment of FIGS. 13 and 14. As can be seen, the wheel frame is supported on columns 150 and 152. These columns are mounted above wheel frame switches, which are activated on forward or backward tilting. Sideways tilting of the wheel frame moves column 154 on the side above its own microswitch, and a corresponding column on the other side, not shown.

Figure 16:
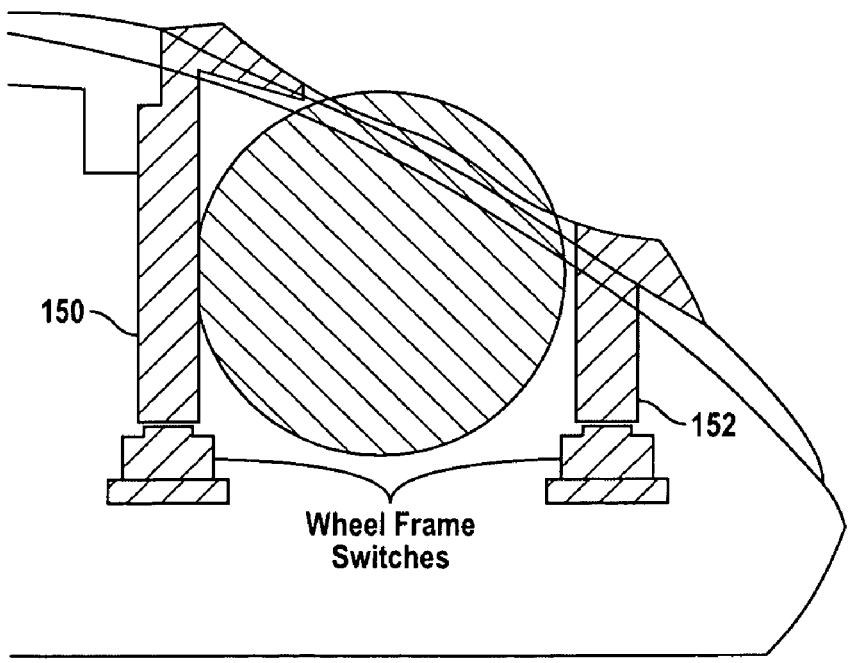
FIG. 16 is a cross section through the wheel of the embodiment of FIG. 13.

FIG. 16 is a longitudinal cross section view through the wheel illustrating the columns and wheel frame switches.

Figure 17:
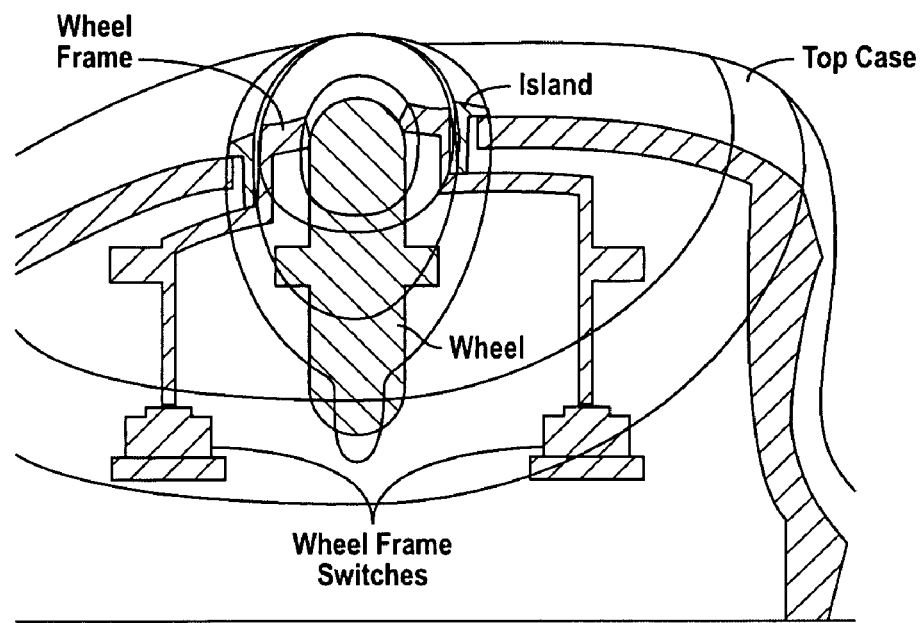
FIG. 17 is a lateral cross section through the wheel axis of the embodiment of FIG. 13.

FIG. 17 is a lateral cross-sectional view through the wheel axis illustrating in phantom the wheel, the wheel frame switches and the wheel frame itself.

Figure 18:
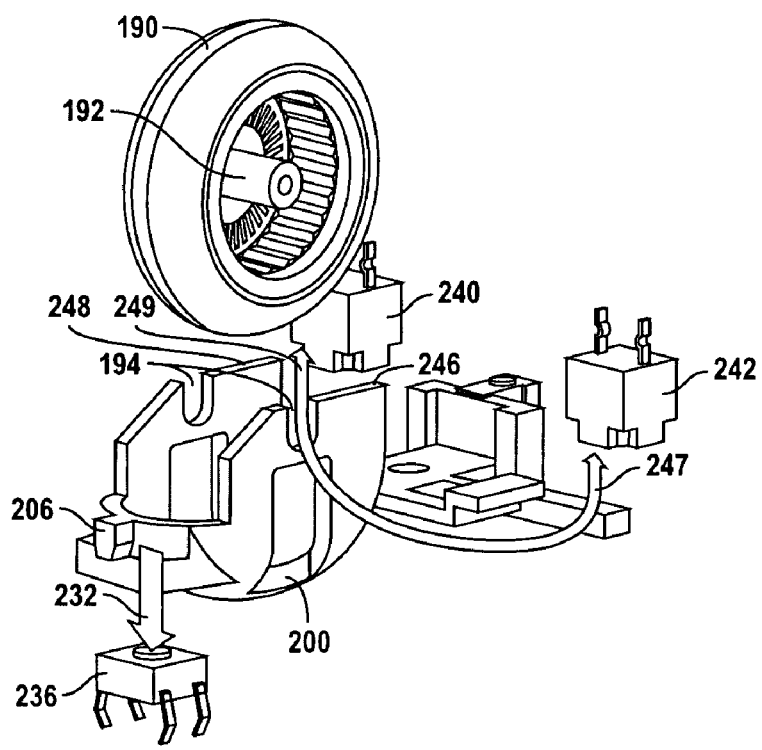
FIG. 18 is an exploded perspective view of an embodiment of a wheel supported on a rocking member for horizontal scrolling to activate horizontal tilting switches.
Figure 19:
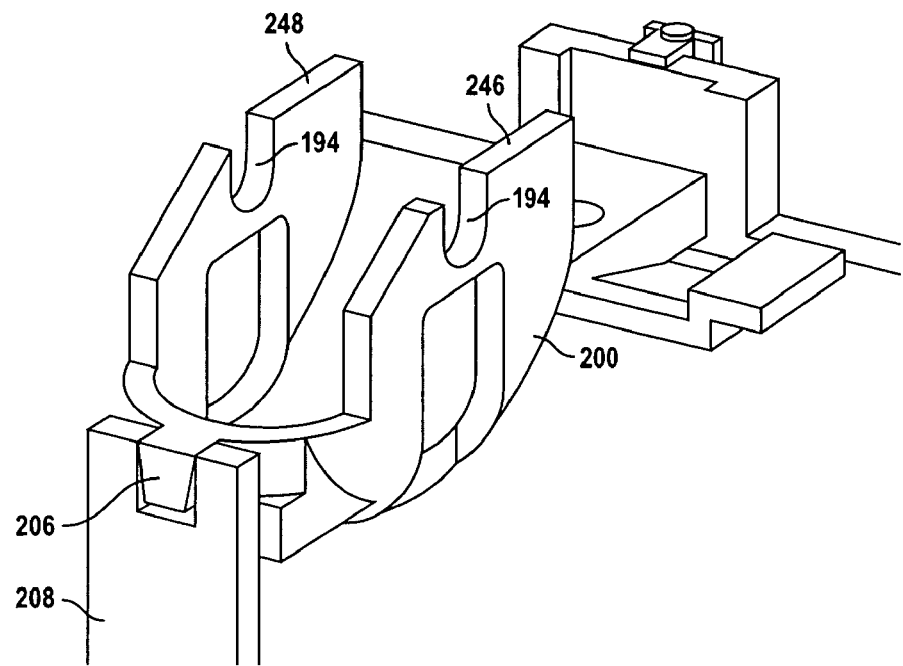
FIG. 19 is another exploded perspective view of the embodiment of FIG. 18 illustrating additional details of the horizontal scrolling mechanism.
Figure 20:
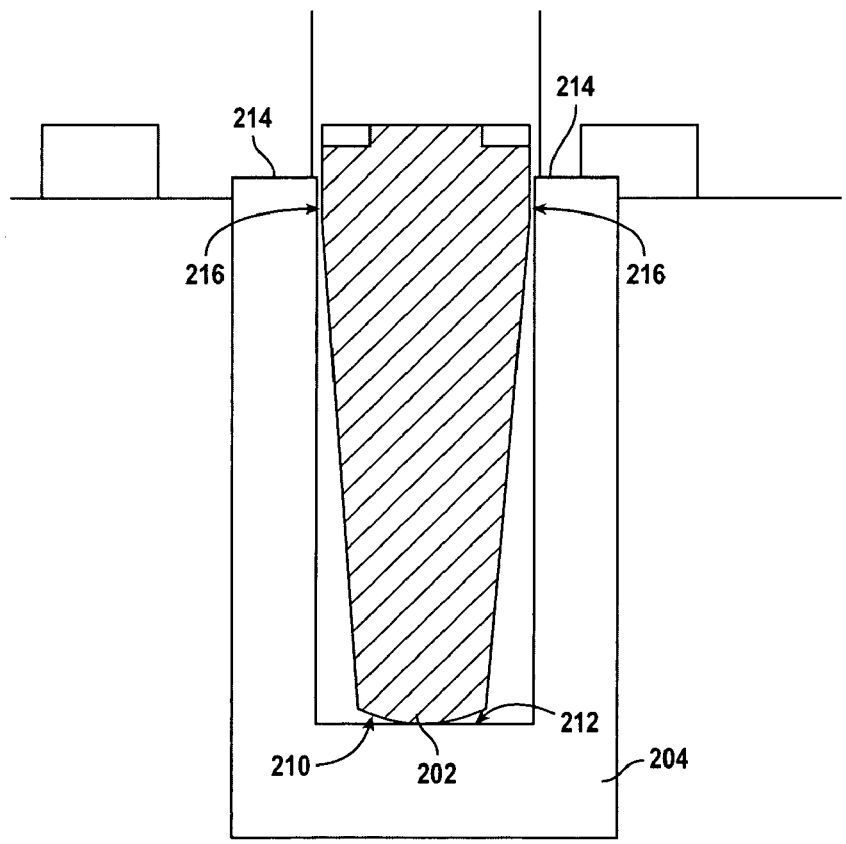
FIG. 20 is a simplified rear elevational view of the embodiment of FIG. 18 illustrating the back portion of the rocking member.
Figure 21:
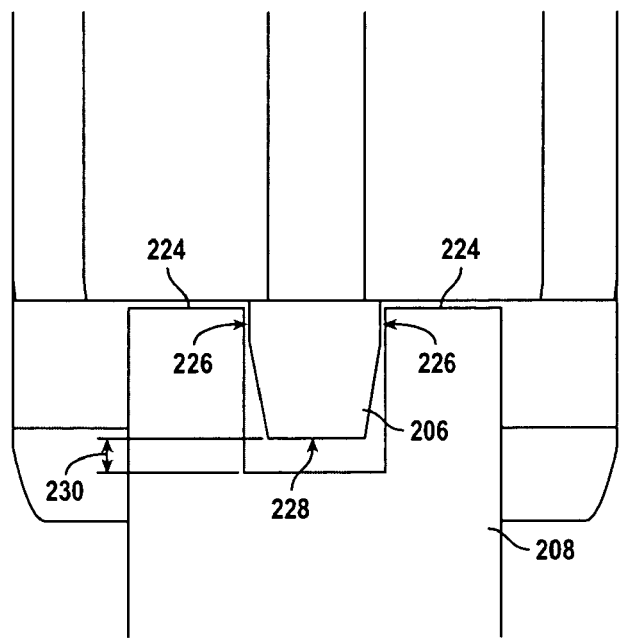
FIG. 21 is a simplified front elevational view of the embodiment of FIG. 18 illustrating the front portion of the rocking member.

In the embodiment shown in FIGS. 18 and 19, a wheel 190 includes a shaft 192 which is rotatably supported on a pair of slots 194 of a rocking member 200. As best seen in FIGS. 20 and 21, the rocking member 200 has a back rocker portion 202 supported by a back rocker support 204 and a front rocker portion 206 supported by a front rocker support 208. In FIG. 20, the bottom of the back rocker portion 202 has a curved surface 210 that rocks from side to side on the horizontal surface 212 of the back rocker support 204. The back rocker portion 202 desirably tapers to a narrower bottom to facilitate the side-to-side rocking motion with respect to the back rocker support 204. The back rocker support 204 is U-shaped in configuration and includes side supports 214 that are spaced from the two sides of the back rocker portion 202 by small gaps 216. The small gaps 216 provide clearance for the back rocker portion 202 to rock from side to side and provide horizontal tilting of the wheel 190. As shown in FIG. 21, the front rocker support 208 is also U-shaped in configuration and includes side supports 224, which are spaced from the two opposite sides of the front rocker portion 206 by small gaps 226 to provide clearance for the front rocker portion 206 to rock from side to side. The front rocker support 208 desirably also tapers to a narrower bottom 228 to facilitate the side-to-side rocking motion of the rocking member 200 with respect to the front rocker support 208. The bottom 228 of the front rocker portion 206 is spaced from the horizontal surface of the front rocker support 208 by a gap 230, which allows the front rocker portion 206 to move downward with respect to the front rocker support 208 as shown by the arrow 232 in FIG. 18. The front rocker portion 206 rests on top of a front switch 236 and activates the front switch 236 when pressed downward, pivoting relative to a back hinge formed at the contact between the bottom 210 of the back rocker portion and the horizontal surface 212 of the back rocker support 204.

As illustrated in FIG. 18, the horizontal tilting of the wheel 190 is used to activate a pair of side switches, a right side switch 240 and a left side switch 242, which are horizontal tilting switches. During horizontal tilting, the wheel 190 and the rocking member 200 move from side to side together, while the wheel 190 is rotatable in the forward and backward directions with respect to the rocking member 200 to produce vertical scrolling. When the assembly of the wheel 190 and rocking member 200 horizontally tilts to the right, the right side of the assembly moves downward and the left side of the assembly moves upward. A left extension 246 of the rocking member 200 tilts upward to activate the left switch 242 as shown by the arrow 247. Alternatively, the left extension 246 may be an extension from the wheel 190 instead. When the assembly of the wheel 190 and rocking member 200 horizontally tilts to the left, the left side of the assembly moves downward and the right side of the assembly moves upward. A right extension 248 of the rocking member 200 tilts upward to activate the right switch 240 as shown by the arrow 249. Alternatively, the right extension 248 may be an extension from the wheel 190 instead.

Figure 22:
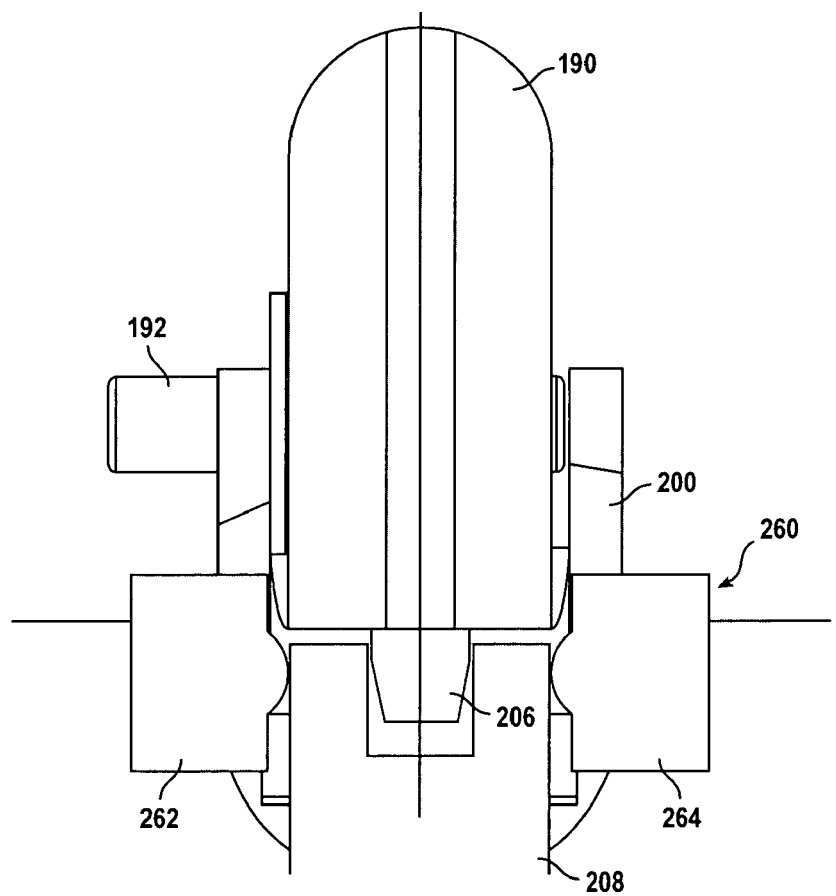
FIG. 22 is a simplified front elevational view of the embodiment of FIG. 18 illustrating the optical encoder for the wheel.

FIG. 22 shows the optical encoder 260 for the wheel 190, which includes an optical emitter 262 on one side and an optical receiver 264 on the other side of the wheel 190. The optical encoder 260 is typically mounted to the base of the device, such as the PCB. The wheel 190 includes spaced apertures around a circumference at a distance from the center shaft 192 to permit light to transmit intermittently from the optical emitter 262 to the optical receiver 264. The horizontal tilting of the wheel 190 will affect the alignment of the apertures with respect to the optical encoder 260. By keeping the tilting of the wheel 190 to a minimal amount during horizontal tilting, the misalignment of the apertures with respect to the optical encoder 260 is sufficiently small so that it will not affect the optical encoding function. In addition, the downward movement of the front rocker portion 206 is also relatively small so as not to affect the transmission of light between the optical emitter 262 and the optical receiver 264 through the wheel apertures.

Figure 23:
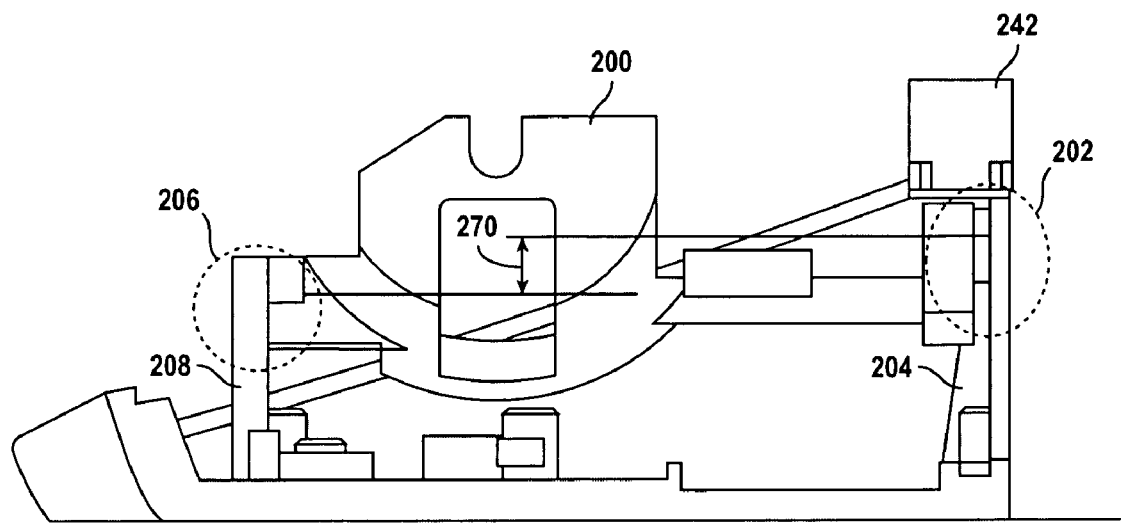
FIG. 23 is a simplified side elevational view of the embodiment of FIG. 18.

As shown in the side view of FIG. 23, the support for the back rocker portion 202 is disposed at a higher elevation than the support for the front rocker portion 206 by a distance 270. In other embodiments, the reverse may be true or the back rocker portion 202 and the front rocker portion 206 may be supported at the same height. The rocking member 200 in the embodiment shown is a single component, which is more cost-effective to manufacture. In other embodiments, the rocking member 200 may be assembled from several components. The front switch 236 and the two side tilting switches 240, 242 are configured to be independently activated. In the embodiment shown, the side tilting switches 240, 242 are disposed generally above the rocking member 200. In alternative embodiments, the side tilting switches 240, 242 may be disposed at a different height (e.g., below the rocking member 200), provided the left and right extensions from the rocking member 200 are positioned to activate the side tilting switches 240, 242 during horizontal tilting of the wheel 190 and rocking member 200. The two side tilting switches 240, 242 are activated vertically, but other side tilting switches that are activated horizontally may be used in other embodiments in which the switches are positioned differently and the extensions used to activate the side switches are configured differently. The front and side switches may be force sensitive switches such as force-sensitive resistors in some embodiments.

Figure 24:
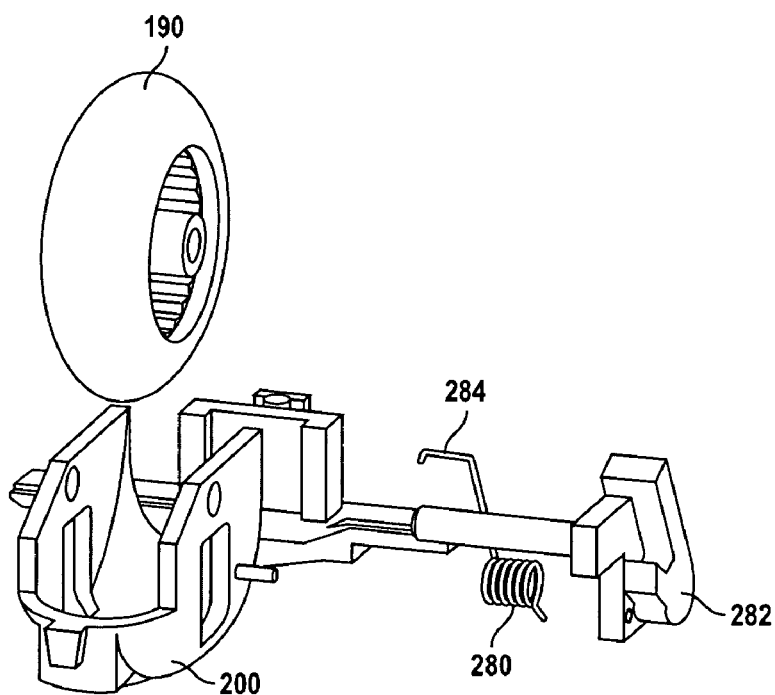
FIG. 24 is another exploded perspective view of the embodiment of FIG. 18 illustrating a ratchet mechanism for the wheel.

FIG. 24 illustrates a ratchet mechanism for the wheel 190. The ratchet mechanism includes a ratchet spring 280 coupled to a ratchet support 282. The ratchet spring 280 includes a ratchet extension 284 coupled with the wheel 190 which rotates to generate the ratcheting effect during vertical rotation of the wheel 190.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. An input device for scrolling comprising:
a rotatable member;
a rocking member configured to support the rotatable member and allow rotation of the rotatable member with respect to the rocking member, the rocking member being supported to rock from side to side to provide sideways tilting of the rotatable member;
at least one tilting switch disposed near the rocking member and configured to be activated by sideways rocking of the rocking member and sideways tilting of the rotatable member;
a back support configured to rotatably support a back-rocking portion of the rocking member, the back rocking portion having a surface that contacts a surface of the back support, wherein the rocking member is further configured to pivot downward relative to the back support, and wherein the contacting surfaces of the back support and back rocking portion are configured to move relative to one another if the rocking member is tilted sideways, and to move relative to one another if the rocking member is pivoted downward relative to the back support; and
a front support configured to rotatably support a front-rocking portion of the rocking member in a depressed position, the front-rocking portion having a surface that faces a surface of the front support, wherein the facing surfaces are configured to contact and move relative to one another if the rocking member is tilted sideways, and to move relative to one another if the rocking member is pivot downward relative to the back support.

2. The input device of claim 1, wherein the at least one tilting switch includes a left tilting switch disposed on a left side of the rocking member and a right tilting switch disposed on a right side of the rocking member, and wherein sideways rocking of the rocking member to one side activates one of the two tilting switches and sideways rocking of the rocking member to another side activates another of the two tilting switches.

3. The input device of claim 2, wherein the back-rocking portion includes a tapered extension that tapers from a first end to a second end that forms a curved surface configured to contact the back support.

4. The input device of claim 3, wherein the curved surface is configured to rock on the back support.

5. The input device of claim 3, wherein the back support includes a trench that includes a bottom surface configured to provide rocking support to the tapered extension.

6. The input device of claim 5, wherein the trench includes a first wall and a second wall that are proximate, respectively, to a first side and a second side of the tapered extension, and the first wall is separated from the first side by a first gap, and the second wall is separated from the second side by a second gap.

7. The input device of claim 6, wherein the first gap and the second gap provide clearance for the sideways rocking of the rocking member.

8. The input device of claim 1, further comprising a front switch proximate to a front end of the rocking member, wherein the rocking member is configured to pivot downward to activate the front switch.

9. The input device of claim 8, wherein the rocking member is configured to pivot downward to provide a mouse click function.

10. The input device of claim 9, wherein the rocking member is configured to pivot downward about a hinge formed by a curved surface of a tapered extension of a back-rocking portion of the rocking member and a bottom surface of a back support configured to contact the curved surface.

11. The input device of claim 1, wherein the front-rocking portion includes a tapered extension that tapers from a first end to a second end that is configured to contact the front support to provide rocking support to the tapered extension.

12. The input device of claim 1, wherein the front support includes a trench that includes a bottom surface configured to provide rocking support to the tapered extension.

13. The input device of claim 12, wherein the trench includes a first wall and a second wall that are respectively proximate to a first side and a second side of the tapered extension, and the first wall is separated from the first side by a first gap, and the second wall is separated from the second side by a second gap.

14. The input device of claim 13, wherein the first gap and the second gap provide clearance for the sideways rocking of the rotatable member.

15. The input device of claim 1, wherein the back-rocking portion is disposed above the front-rocking portion.

\* \* \* \* \*